United States Patent [19]

Harada et al.

[11] Patent Number: 5,110,527
[45] Date of Patent: May 5, 1992

[54] POLYTETRAFLUOROETHYLENE POROUS MATERIAL AND PROCESS FOR PRODUCING THE SAME

[75] Inventors: Akira Harada; Hiroshi Mano, both of Osaka, Japan

[73] Assignee: Sumitomo Electric Industries Ltd., Osaka, Japan

[21] Appl. No.: 538,443

[22] Filed: Jun. 15, 1990

[30] Foreign Application Priority Data

Jun. 15, 1989 [JP] Japan .................. 1-150379

[51] Int. Cl.⁵ .................. B27J 5/00; B29C 47/40
[52] U.S. Cl. .................. 264/127; 264/210.7; 264/211; 264/211.2; 521/56; 521/60; 521/145; 521/134; 521/59
[58] Field of Search .................. 364/127, 210.7, 211, 364/211.2; 521/56, 60, 145, 134

[56] References Cited

U.S. PATENT DOCUMENTS

| | | | |
|---|---|---|---|
| 4,110,392 | 8/1978 | Yamazaki | 264/127 |
| 4,707,314 | 11/1987 | Kawahigashi et al. | 264/127 |
| 4,760,102 | 7/1988 | Moriyama et al. | 264/127 |
| 4,826,725 | 5/1989 | Harlow | 264/127 |
| 5,006,292 | 4/1991 | Shii et al. | 264/127 |

*Primary Examiner*—Morton Foelak
*Attorney, Agent, or Firm*—Sughrue, Mion, Zinn, Macpeak & Seas

[57] ABSTRACT

A polytetrafluoroethylene porous material and a process for producing the same are disclosed, the material comprising a mixture of polytetrafluoroethylene having a number-average molecular weight of 2,000,000 or more and polytetrafluoroethylene having a number-average molecular weight of 1,000,000 or less, the material having been stretched at least uniaxially.

8 Claims, No Drawings

POLYTETRAFLUOROETHYLENE POROUS MATERIAL AND PROCESS FOR PRODUCING THE SAME

FIELD OF THE INVENTION

The present invention relates to a polytetrafluoroethylene (PTFE) porous material for use as a filter for precision filtration and in other applications. More particularly, it relates to a PTFE porous material having a high porosity with relatively large pore diameters and a process for producing such porous material.

BACKGROUND OF THE INVENTION

Membrane filters made of porous PTFE presently on the market generally have average pore diameters ranging from about 0.1 to 10 $\mu$m with the maximum average pore diameter being 10 $\mu$m at the most. Recently, however, there is a demand for development of a PTFE membrane filter having a larger average pore diameter. For use as an air filter in clean rooms or the like, membrane filters are required to have low pressure losses. Further, PTFE porous materials are best suited for use as a sheathing material for ultra-high-speed coaxial cables, and the higher the porosity thereof, the higher the performance of the cables.

Among conventional processes for producing PTFE porous materials, a representative method is to heat unsintered formed PTFE containing a liquid lubricant to about 327° C. or more while the PTFE is kept in an at least uniaxially stretched state (as described in JP-B-42-13560). (The term "JP-B" as used herein means an "examined Japanese patent publication".) According to this method, PTFE polymers having average molecular weights (number-average molecular weights) as a high as 3,000,000 or more and showing good stretchability have conventionally been used, and the porosity can be controlled by changing the degree of stretching. This method, however, is defective in that the stretching of unsintered formed PTFE can only be performed at limited degrees of stretching and, hence, the porosity also is heightened in a limited range.

A method has been proposed in which sintered formed PTFE is annealed to heighten crystallinity and then the PTFE is uniaxially stretched, thereby to produce a PTFE porous membrane having micropores (as described in JP-B-53-42794). However, since the stretching cannot be conducted at higher degrees of stretching, membranes having low porosity and poor permeability can only be obtained.

A recently proposed method is to produce a PTFE porous membrane having micropores with a high porosity by use of low molecular weight PTFE that shows poor stretchability (as described in JP-A-64-78823). (The term "JP-A" as used herein means an "unexamined published Japanese patent application".) This method employs a special procedure comprising shaping a PTFE fine powder having a number-average molecular weight of 1,000,000 or less by means of paste extrusion, subjecting the formed PTFE to sintering and then heat treatment to heighten crystallinity, and then stretching the resulting PTFE at least uniaxially. This method, however, is intended to produce porous membranes having small average pore diameters and is limited in heightening porosity.

As described above, there have been no known method which is useful for producing a PTFE porous material having a high porosity and a large average pore diameter.

SUMMARY OF THE INVENTION

The present inventors have conducted intensive studies in order to obtain a PTFE porous material which has a high porosity and large pore diameters so as to meet the recent demands described above. As a result, it has now been found that by use of a mixture of high molecular weight PTFE having a number-average molecular weight of 2,000,000 or more and low molecular weight PTFE having a number-average molecular weight of 1,000,000 or less, a porous material having a high porosity and relatively large pore diameters can be obtained by means of ordinary paste extrusion, stretching, etc. It was unexpected that low molecular weight PTFE having a number-average molecular weight of 1,000,000 or less, which has poor stretchability, can be well stretched in an unsintered state, although mixed with high molecular weight PTFE, to give a porous material having practical performance. Furthermore, in view of the facts (a) that the method in which low molecular weight PTFE is sintered, crystallized, and then stretched (as described in JP-A-64-78823) produces porous materials having small average pore diameters and (b) that increases in porosity and in average pore diameter are limited even though high molecular weight PTFE is used, it is surprising that a PTFE porous material can be obtained which has a higher porosity than conventional ones and also has large pore diameters by combining both the low molecular weight PTFE and the high molecular weight PTFE.

The present invention has been completed based on the above finding.

Accordingly, an object of the present invention is to provide a PTFE porous material having a high void content and a large average pore diameter.

Another object of the present invention is to provide a process for producing the above PTFE porous material.

Other objects and effects of the present invention will be apparent from the following description.

In one aspect of the present invention, a polytetrafluoroethylene porous material is provided which comprises a mixture of polytetrafluoroethylene having a number-average molecular weight of 2,000,000 or more and polytetrafluoroethylene having a number-average molecular weight of 1,000,000 or less, the material having been stretched at least uniaxially.

In another aspect of the present invention, a process for producing a polytetrafluoroethylene porous material is provided which process comprises the steps of: forming a mixture comprising a polytetrafluoroethylene fine powder having a number-average molecular weight of 2,000,000 or more, a polytetrafluoroethylene fine powder having a numberaverage molecular weight of 1,000,000 or less, and a liquid lubricant into a predetermined shape; subsequently stretching the formed mixture at least uniaxially in an unsintered state; and then heat-treating the stretched mixture at a temperature not lower than the melting point of polytetrafluoroethylene.

DETAILED DESCRIPTION OF THE INVENTION

The present invention is described below in detail.

The term "average molecular weight" used herein means "number-average molecular weight".

In the present invention, a mixture of a high molecular weight PTFE fine powder having an average molecular weight of 2,000,000 or more and a low molecular weight PTFE fine powder having an average molecular weight of 1,000,000 or less is used as PTFE raw materials.

PTFE polymers having average molecular weights of 2,000,000 or more have conventionally been used extensively as a raw material for producing PTFE porous materials. Low molecular weight PTFE polymers having average molecular weights less than 2,000,000, particularly less than 1,000,000, have not been generally used for the production of porous materials since they show poor stretchability in an unsintered state, and therefore high molecular weight PTFE polymers having average molecular weights of from 2,000,000 to 20,000,000 have been used in that application. Such a general-purpose high molecular weight PTFE polymer may be used as the high molecular weight PTFE in the present invention.

On the other hand, the low molecular weight PTFE used in the present invention must have an average molecular weight of 1,000,000 or less, with the preferred PTFE fine powder having an average molecular weight of from 200,000 to 1,000,000.

The difference between the average molecular weight of the high molecular weight PTFE and that of the low molecular weight PTFE is preferably 1,000,000 or more, and more preferably 3,000,000 or more.

Although the mechanism of giving a porous material having a high porosity and large pore diameters according to the present invention has not yet been elucidated, it may be presumed that the PTFE having an average molecular weight of 2,000,000 or more contributes to the formation of the skeletal structure of the porous material through stretching, while the PTFE having an average molecular weight of 1,000,000 or less contributes at the time of stretching to attaining a high porosity and large pore diameters. Therefore, if the average molecular weight of the low molecular weight PTFE exceeds 1,000,000, it becomes difficult to accomplish the objects of the present invention The ratio of the high molecular weight PTFE to the low molecular weight PTFE in the mixture thereof may be suitably determined according to the desired void content and average pore diameter The larger the proportion of the low molecular weight PTFE, the higher the resulting porosity but the poorer the stretchability of the mixture. Therefore, the amount of the low molecular weight PTFE is, assuming that the amount of the mixture is 100 parts by weight, generally from 90 to 10 parts by weight per 10 to 90 parts by weight of the high molecular weight PTFE, preferably from 85 to 20 parts by weight per 15 to 80 parts by weight of the high molecular weight PTFE, and more preferably from 80 to 30 parts by weight per 20 to 70 parts by weight of the high molecular weight PTFE. In other words, the weight ratio of the low molecular weight PTFE to the high molecular weight PTFE in the mixture is generally from 90/10 to 10/90, preferably from 85/15 to 20/80, and more preferably from 80/20 to 30/70.

Each of the high molecular weight PTFE and the low molecular weight PTFE may be a combination of two or more kinds of PTFE polymers having different molecular weights. The term "PTFE fine powder" used herein means a powder produced by coagulating a PTFE dispersion obtained by emulsion polymerization.

As the liquid lubricant, various kinds of lubricants conventionally used in the paste-extrusion process can be employed.

Examples of such lubricants include petroleum solvents and hydrocarbon oils such as solvent naphtha and white oil, toluols, ketones, esters, silicone oil, fluorocarbon oil, solutions obtained by dissolving polymers such as polyisobutylene and polyisoprene in these solvents, a mixture of two or more of these, and water or aqueous solutions containing a surfactant. Among these, solvent naphtha and white oil are preferably used in the present invention.

The mixing ratio of the liquid lubricant to the PTFE mixture may be selected within the range generally employed in the conventional paste-extrusion process. Generally, the amount of the liquid lubricant is preferably from 15 to 40 parts by weight, and more preferably from 20 to 30 parts by weight, per 100 parts by weight of the PTFE mixture.

In the present invention, a porous material is produced by forming a mixture comprising a PTFE fine powder having an average molecular weight of 2,000,000 or more, a PTFE fine powder having an average molecular weight of 1,000,000 or less. and a liquid lubricant into a predetermined shape, subsequently stretching the formed mixture at least uniaxially in an unsintered state, and then heat-treating the stretched mixture at a temperature not lower than the melting point of polytetrafluoroethylene.

The method for mixing the high molecular weight PTFE fine powder and the low molecular weight PTFE fine powder is not particularly limited. For example, the PTFE fine powders and a liquid lubricant are put in a sealed vessel and mixed to form a mixture, or a dispersion of the high molecular weight PTFE and a dispersion of the low molecular weight PTFE, which are separately prepared by emulsion polymerization, are mixed and then dried to form a mixture.

A liquid lubricant is mixed with the PTFE fine powder mixture and the resulting mixture is formed into a predetermined shape by the paste-extrusion process as described in JP-B-42-13560 or by other conventional means. In general, such mixture is formed into a predetermined shape by preforming (pressure-preforming) the mixture at a pressure, for example, of about 1 to 50 kg/cm$^2$ and the preform is then extruded with a paste extruder, rolled with calender rolls or the like, or extruded and then rolled.

The shape of the formed mixture is not limited and may be a sheet, tube, rod, strip, film, or others. Thin sheets can be obtained by rolling.

The thus-obtained unsintered formed mixture is then stretched at least uniaxially after the liquid lubricant is removed or without removing the lubricant.

The stretching may be performed while the liquid lubricant is contained in the mixture or after the lubricant is removed by evaporation, extraction, etc. For removing the liquid lubricant by heating, the formed mixture is generally passed through a heating oven at from 200 to 330° C. In the case where a liquid lubricant having a relatively high boiling point has been used, removal by extraction is preferred. Where stretching is conducted while the liquid lubricant is contained in the formed mixture, the liquid lubricant is usually removed before the subsequent heat treatment. However, if the liquid lubricant contained has a relatively high boiling point such as silicone oil or a fluorocarbon, the liquid lubricant can be removed simultaneously with the heat treatment.

The stretching of the formed mixture in a predetermined shape can be accomplished by mechanically expanding the formed mixture in conventional procedures. In the case of a sheet, for example, stretching can be performed by regulating the wind-up speed so as to be higher than the feed speed when the sheet is wound up from one roll to another, or by holding two opposite sides of the sheet and expanding the sheet so as to widen the distance of the two sides. In the case of a tube or rod, stretching is easily attained by expanding the tube or rod in the longitudinal direction thereof Various stretching techniques may be employed such as multistage stretching, successive biaxial stretching, and simultaneous biaxial stretching.

The stretching temperature is generally not higher than the melting point of PTFE. However, when stretching is conducted in a dry heat atmosphere such as in a heating oven, stretching may be carried out in an atmosphere having a temperature not lower than the melting point because of low thermal conductivity of PTFE.

The formed mixture is generally stretched 1.5 times (in terms of area) or more, but for attaining a high void content, it is preferred to stretch 5 times (in terms of area) or more. In the case of biaxial stretching, it is preferred that the formed mixture be stretched 2 to 10 times (in terms of length) in one direction, with the ratio of lengthwise stretching to crosswise stretching being in the range of from 1/5 to 5/1.

The thus-stretched PTFE porous material is heat-treated at a temperature not lower than about 327° C., which is the melting point of PTFE, while the porous material is kept in the stretched state. When heated to 327° C. or more, the stretched PTFE porous material is prone to shrink, and further, if it is allowed to stand without undergoing heat treatment, it shrinks so that its porous structure disappears or becomes uneven. For these reasons, the PTFE porous material is heat-treated in a stretched state. The heat treatment can be carried out according to conventional procedures. The heat treatment is preferably carried out by keeping the PTFE porous material in a heating oven having a temperature of, for example, 350° to 550° C. for a period of several tens of seconds to several tens of minutes. Formed materials are mostly sintered by heat treatment at such temperatures.

The porous material thus heat-treated may be further stretched, whereby the porosity can be heightened even more.

In addition to the liquid lubricant, additives and fillers may be incorporated in the PTFE mixture prior to forming and stretching. For example, coloring pigments may be added, and other additives and fillers such as inorganic fillers, e.g., carbon black, graphite, silica, asbestos, glass powder, glass fibers, silicates, and carbonates, metal powders, metal oxides, and metal sulfides may be incorporated for improving wear resistance, preventing low-temperature melt flow, and facilitating the formation of pores and for other purposes. Furthermore, for the purpose of promoting the formation of a porous structure, substances that can be removed or decomposed by heating, extraction, dissolution, etc., such as ammonium chloride, sodium chloride, and other plastics and rubbers, may be incorporated in the form of a powder or liquid.

The PTFE porous material of the present invention is characterized as having a high porosity and a relatively large average pore diameter. Although properties vary depending on the mixing ratio of the high molecular weight PTFE to the low molecular weight PTFE and on stretching conditions, etc., there can, for example, be obtained a PTFE porous material having a porosity as high as 80% or more, preferably 85 to 90%, and an average pore diameter as large as 15 $\mu$m or more, preferably 20 to 30 $\mu$m. Such porous materials can be in various forms including sheet form and tube form and can have various thicknesses ranging from extremely small thicknesses to several hundreds $\mu$m or more.

Therefore, the PTFE porous material of the present membrane filter with low pressure loss, a sheathing material or ultra-high-speed coaxial cables, a diaphragm, a lubricating sliding member, and an adhesive. The PTFE porous material of the present invention is also suitable for applications in which porous materials are used after pores thereof are filled with other substances. For example, a PTFE porous material of the invention on which a pigment has been fixed is suited for use as the background reflector of an electrochromic display.

The present invention will now be explained in more detail by reference to the following Examples and Comparative Examples, but the present invention is not construed as being limited to these Examples.

In the Examples and Comparative Examples, porosities and average pore diameters were determined as follows.

Porosity

In accordance with ASTM-D-792, the porosity was obtained from specific gravity measured in water (apparent specific gravity) and the specific gravity of PTFE. The larger the porosity, the better the permeability.

Average Pore Diameter

In accordance with ASTM-F-316-80, pore diameter distribution was obtained and an average pore diameter was calculated therefrom.

EXAMPLE 1

400 g of PTFE fine powder F-104 (number-average molecular weight 4,000,000 to 5,000,000) produced by Daikin Industries, Ltd., Japan was mixed with 600 g of PTFE fine powder CD-4 (number-average molecular weight 500,000) produced by Asahi Glass Co., Ltd., Japan, and this mixture was further mixed with 260 g of solvent naphtha as a liquid lubricant.

The resulting mixture was pressure-preformed at a pressure of 50 kg/cm$^2$, subsequently extruded with a paste extruder, and then formed into a sheet having a thickness of 0.3 mm by rolling. This sheet was heat-dried by passing it through a heating oven having a temperature of 200° C. to remove the solvent naphtha.

The resulting sheet was stretched uniaxially (in the longitudinal direction) at a stretching degree of 100% (2 times) by means of a roll-type stretching machine heated at about 275° C., and then further stretched in the same direction at a stretching degree of 200% (3 times based on the state after the first stretching) with a roll-type stretching machine heated at about 200° C. The thus-stretched sheet was heated at about 500° C. for one minute while kept in the stretched state, thereby sintering the sheet.

The sheet-form PTFE porous material thus obtained had a thickness of 90 μm, a porosity of 90%, and an average pore diameter of 20 μm.

COMPARATIVE EXAMPLE 1

A PTFE porous material was produced under the same conditions as in Example 1 except that 1,000 g of high molecular weight PTFE fine powder F-104 manufactured by Daikin Industries, Ltd. was used as the PTFE. As a result, the porous material thus obtained had undesired properties, with the porosity being 80% and the average pore diameter being 5 μm.

EXAMPLE 2

200 g of PTFE fine powder F-104 produced by Daikin Industries, Ltd. was mixed with 800 g of PTFE fine powder CD-4 manufactured by Asahi Glass Co., Ltd., and this mixture was further mixed uniformly with 260 g of solvent naphtha. In the same manner as in Example 1, the resulting mixture was pressure-preformed, subsequently extruded, and then formed into a sheet having a thickness of 0.1 mm by rolling. This sheet was heat-dried to remove the solvent naphtha, subsequently stretched in the longitudinal direction at a stretching degree of 100% (2 times) by means of a roll-type stretching machine heated at about 150° C., and then further stretched in the same direction at a stretching degree of 300% (4 times based on the state after the first stretching) in an atmosphere of about 330° C.

The thus-stretched sheet was heated at about 500° C. for one minute while kept in the stretched state, thereby sintering the sheet. After the heat treatment, the sheet was further stretched in the lateral direction at a stretching degree of 50% in an atmosphere of 150° C.

The biaxially stretched PTFE porous sheet thus obtained had a thickness of 50 μm, a porosity of 92%, and an average pore diameter of 30 μm.

This porous sheet was evaluated as an air filter, and was found to have a pressure loss (air flow speed, 5.33 cm/sec) of 6 mmH$_2$O and a trapping rate for 0.3 μm particles (air flow speed, 5.33 cm/sec) of 95%.

COMPARATIVE EXAMPLE 2

A PTFE porous material was produced under the same conditions as in Example 2 except that 1,000 g of high molecular weight PTFE fine powder F-104 manufactured by Daikin Industries, Ltd. was used as the PTFE. As a result, the thus-obtained porous material had undesired properties, with the thickness being 40 μm, the porosity being 83%, and the average pore diameter being 10 μm.

EXAMPLE 3

350 g of PTFE fine powder F-104 produced by Daikin Industries, Ltd. was mixed with 650 g of PTFE fine powder CD-4 produced by Asahi Glass Co., Ltd., and this mixture was further mixed uniformly with 230 g of solvent naphtha. In the same manner as in Example 1, the resulting mixture was pressure-preformed, subsequently extruded, and then formed into a sheet having a thickness of 0.1 mm by rolling. This sheet was heat-dried to remove the solvent naphtha, subsequently stretched in the longitudinal direction at a stretching degree of 100% (2 times) by means of calender rolls heated at about 150° C., and then further stretched in the same direction at a stretching degree of 200% (3 times based on the state after the first stretching) in an atmosphere of about 330° C. This stretched sheet was heated at about 500° C. for one minute while kept in the stretched state, thereby sintering the sheet.

The porous sheet thus obtained had a thickness of 60 μm and a porosity of 85% and was found to be a high-porosity porous material suited for use as a sheathing material for coaxial cables.

COMPARATIVE EXAMPLE 3

A porous sheet was produced in the same manner as in Example 3 except that 1,000 g of high molecular weight PTFE fine powder F-104 manufactured by Daikin Industries, Ltd. was used as the PTFE. As a result, the porous sheet thus obtained had undesired properties, with the porosity being as low as 75%.

EXAMPLE 4

500 g of PTFE fine powder F-104 produced by Daikin Industries, Ltd. was mixed with 500 g of PTFE fine powder CD-4 produced by Asahi Glass Co., Ltd., and this mixture was further mixed uniformly with 240 g of solvent naphtha. In the same manner as in Example 1, the resulting mixture was pressure-preformed, subsequently extruded, and then formed into a sheet having a thickness of 0.37 mm by rolling. This sheet was heat-dried to remove the solvent naphtha, and then stretched in the longitudinal direction at a stretching degree of 550% (6.5 times) in an atmosphere of about 250° C. This stretched sheet was heated at about 500° C. for one minute while kept in the stretched state, thereby sintering the sheet.

The porous sheet thus obtained had an average pore diameter of 20 to 30 μm, a porosity of 90%, and a thickness of 300 μm.

COMPARATIVE EXAMPLE 4

A porous sheet having a thickness of 300 μm was produced in the same manner as in Example 4 except that 1,000 g of high molecular weight PTFE fine powder F-104 manufactured by Daikin Industries, Ltd. was used. However, the porous sheet thus obtained had undesired properties, with the porosity being 81% and the average pore diameter being 5 μm.

According to the present invention, a PTFE porous material having a high porosity and a relatively large average pore diameter can be obtained by the combined use of high molecular weight PTFE and low molecular weight PTFE.

The PTFE porous material of the present invention is useful as a filter with low pressure loss. Further, use of a porous material having a high porosity according to the present invention as a sheathing material for coaxial cables makes ultra-high-speed transmission feasible. Furthermore, a porous material of the present invention on which a pigment, for example, has been fixed in pores thereof is suited for use as the background reflector of an electrochromic display. Thus, owing to its properties, the PTFE porous material of the present invention can be used for applications in many fields.

While the invention has been described in detail and with reference to specific embodiments thereof, it will be apparent to one skilled in the art that various changes and modifications can be made therein without departing from the spirit and scope thereof.

What is claimed is:

1. A process for producing a polytetrafluoro-ethylene porous material which comprises the steps of: forming a mixture comprising a polytetrafluoroethylene fine powder having a number-average molecular weight of 2,000,000 or more, a polytetrafluoroethylene fine powder having a number-average molecular weight of 1,000,000 or less, and a liquid lubricant into a predetermined shape; subsequently stretching the formed mixture at least uniaxially in an unsintered state; and then heat-treating the stretched mixture at a temperature not lower than the melting point of polytetrafluoroethylene.

2. A process as claimed in claim 1, wherein said high molecular weight polytetrafluoroethylene has a number-average molecular weight of from 2,000,000 to 20,000,000, and said low molecular weight polytetrafluoroethylene has a number-average molecular weight of from 200,000 to 1,000,000.

3. A process as claimed in claim 1, wherein the weight ratio of said low molecular weight polytetrafluoroethylene to said high molecular weight polytetrafluoroethylene is from 90/10 to 10/90.

4. A process as claimed in claim 3, wherein the weight ratio of said low molecular weight polytetrafluoroethylene to said high molecular weight polytetrafluoroethylene is from 85/15 to 20/80.

5. A process as claimed in claim 4, wherein the weight ratio of said low molecular weight polytetrafluoroethylene to said high molecular weight polytetrafluoroethylene is from 80/20 to 30/70.

6. A process as claimed in claim 1, wherein the amount of said liquid lubricant is from 15 to 40 parts by weight per 100 parts by weight of the total of said low molecular weight polytetrafluoroethylene and said high molecular weight polytetrafluoroethylene.

7. A process as claimed in claim 6, wherein the amount of sid liquid lubricant is from 20 to 30 parts by per 100 parts by weight of the total of said low molecular weight polytetrafluoroethylene and said high molecular weight polytetrafluoroethylene.

8. A process as claimed in claim 1, wherein said material has a porosity of 80% or more and an average pore diameter of 15 $\mu$m or more.

* * * * *